United States Patent [19]

Kane

[11] Patent Number: 5,352,886
[45] Date of Patent: Oct. 4, 1994

[54] MICRO NON-IMAGING LIGHT CONCENTRATORS FOR IMAGE SENSORS WITH A LENSLET ARRAY

[75] Inventor: Jonathan S. Kane, Wayland, Mass.

[73] Assignee: The United States of America as represented by the Secretary of the Air Force, Washington, D.C.

[21] Appl. No.: 39,656

[22] Filed: Mar. 30, 1993

[51] Int. Cl.⁵ .............................................. H01J 3/14
[52] U.S. Cl. ................................. 260/216; 250/208.2; 359/626
[58] Field of Search ............ 250/216, 208.1, 208.2, 250/208.6; 359/626, 869, 853, 709, 712, 708; 356/121

[56] References Cited

U.S. PATENT DOCUMENTS 3,899,672  8/1975  Levi-Setti ........................... 359/869
4,323,925  4/1982  Abell et al. ......................... 250/216

*Primary Examiner*—David C. Nelms
*Assistant Examiner*—Que T. Le
*Attorney, Agent, or Firm*—Robert L. Nathans

[57] ABSTRACT

An array of micro-sized converging light transmissive channels is positioned between a lenslet array and an array of pixel detectors. The result is that the detectors are substantially smaller than upper portions of the channels and non-optical components may be positioned between the detectors. The side walls of the channels are reflective and have a hyperbolic or parabolic shape to maximize the acceptance angle of rays entering the device for maximum efficiency. A method of producing the channels employing a micro-sized machine bit is also disclosed.

6 Claims, 1 Drawing Sheet

MICRO NON-IMAGING LIGHT CONCENTRATORS FOR IMAGE SENSORS WITH A LENSLET ARRAY

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of image sensors.

Focal plane arrays for sensing light images have been traditionally constructed such that each tiny picture element or pixel detector was as close to its adjacent detector as practicable in order to sample as much of the input scene as possible. This is known as a high fill factor, where the fill factor is defined as the ratio of detector area over the total area of the array. Past emphasis in design was focused on creating greater than ninety percent fill factor arrays.

Recently there has been interest in creating arrays that perform certain low level operations on-chip such a placing transistors or cooling devices on the chip between the image sensing detectors. One approach for achieving this goal is to use a low fill-factor device, i.e., increase the separation between the detectors to accommodate placement of the transistors or cooling devices between the detectors and place a light collecting device such as a micro-lens array in front of the detector array. There are three traditional approaches to collecting light for use with a focal plane array. The most simple is to use a one-to-one imaging system to image the scene upon the array. The disadvantage of this approach is that any part of the image that does not impinge on the detector will be lost. A second approach is to magnify the image. Although this approach is viable, it requires that the magnified image be limited to the size of the total array. Thus the size of the input image is restricted to 1/M times the size of the array where M is the magnification factor.

A third approach utilizes micro-lens arrays. The problem with this approach is that if the lens arrays are diffractive in nature, then higher orders add to the cross talk. In addition, even if they are not diffractive, off-axis rays could be focussed on adjacent detectors, again increasing the cross talk between adjacent detectors.

BRIEF SUMMARY OF THE INVENTION

The aforesaid drawbacks of the prior art approaches are reduced or eliminated by the present invention. In accordance with a preferred embodiment of the invention, an array of tiny pixel size light image detectors are aligned with an array of non-imaging light concentrators comprising tiny converging light transmissive channels having light reflective side wall portions and upper portions and lower portions smaller than the upper portions, the lower portions thereof being aligned with and adjacent the light image detectors and further including a lenslet array, the lenslets thereof being aligned with the upper portions of the converging light transmissive channels. The light image detectors are substantially smaller than the upper portions of the converging light transmissive channels thereby enabling non-optical components to be positioned between the light image sensors if desired. The upper portions of the channels are preferably 100–200 microns in diameter, whereas the lower portions are preferably between 20–50 microns in diameter. The side wall portions of the channels preferably have parabolic or hyperbolic shapes to maximize the efficiency of the device.

BRIEF SUMMARY OF THE DRAWINGS

Other features and advantages of the present invention will become apparent upon study of the following detailed description taken in conjunction with the drawings in which.

DETAILED DESCRIPTION OF PREFERRED EMBODIMENTS OF THE INVENTION

Figure 1:
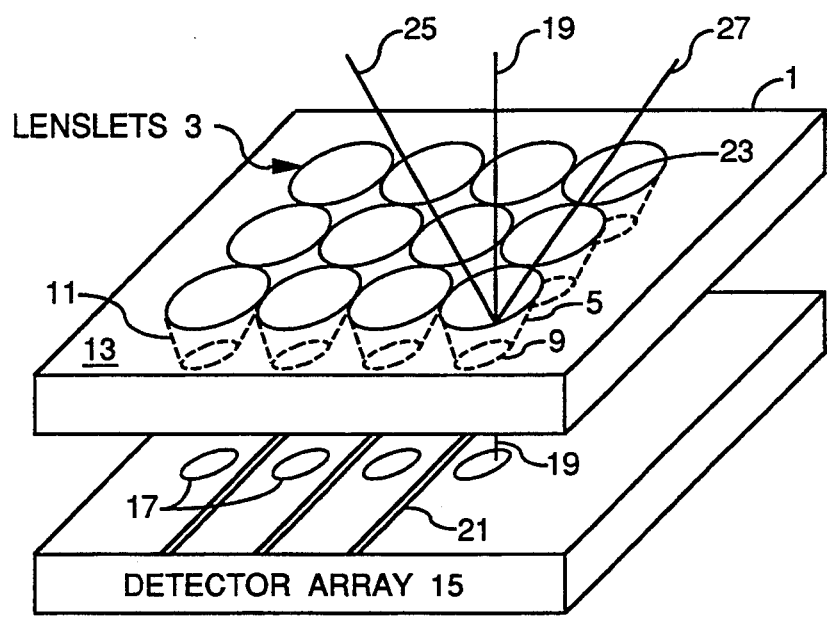
FIG. 1 illustrates an exploded perspective view of a preferred embodiment of the invention.
Figure 2:
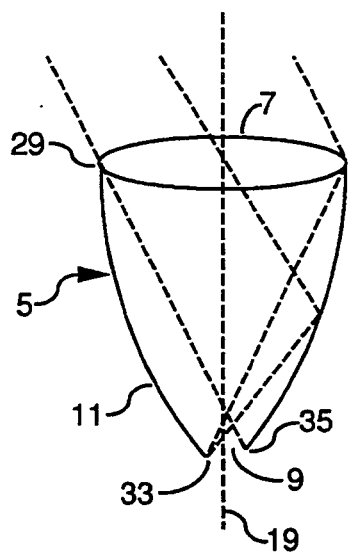
FIG. 2 illustrates one concentrator or converging light transmissive channel of the array of channels of FIG. 1.

Referring now to FIG. 1, channel support member 1 which could be made of quartz, has a plastic lenslet array 3 positioned thereon. An array 13 of light concentrators 5 comprising light transmissive converging channels is formed within channel support member 1 as shown. One such concentrator is shown in FIG. 2 where an upper portion 7 and a lower portion 9 is illustrated, the lower portion 9 being substantially smaller than the upper portion 7. Preferably the diameter or distance between 29 and 31 is between 100–200 microns whereas the diameter of the lower portion 9 or the distance between 33 and 35 is between 20–50 microns.

Each lower concentrator portion 9 is positioned directly adjacent an associated light image detector 17 of detector array 15 although the components are illustrated as being separated in the interest of clarity. The optical axis 19 of each concentrator would intersect the center of an associated pixel detector 17. The diameter of the upper portion of each concentrator is preferably equal to the diameter of an associated lenslet 3. Also, the edges of the lenslets touch at 23 to maximize the gathering of the light. Additionally, inside wall portions 11 are coated with a highly reflective material so that the entering light is efficiently conveyed to the lower portion of the converging light transmissive channel.

Note that this arrangement advantageously allows for substantial separation between pixel detectors 17 so that the aforesaid non-optical elements may be conveniently positioned on the image detector plane chip. These elements 21 could be cooling devices or electronic components such as transistors.

Furthermore, in order to maximize the efficiency of the device, the acceptance angle of light rays entering the upper portion 9 of each concentrator, shown as the angle between rays 25 and 27 in FIG. 1, should be made large so as to capture the most light from the image detected by the device. This has been accomplished by having the reflective side wall portions 11 have parabolic or hyperbolic shapes. This teaching is explained in detail in "Progress in Optics", v. 27, chapter 3 "Non-imaging Optics for Flux Concentrators", edited by E. Wolfe; Elsevier Science Publishers, B. V., North Holland, Netherlands. However, the described converging non-imaging light concentrators are large devices used in solar energy collection devices rather than micro-sized devices employed in the manner of the present invention. If the desired curve profile described is not utilized, more light will be reflected upwardly out of the device to lower its efficiency. The elimination of the lenslets would also result in a reduction of the efficiency of the device since less of the incident light would be passed through the converging channels. This may not be too important for certain applications not requiring high efficiencies.

Figure 3:
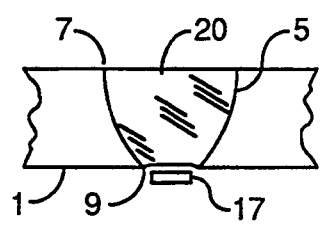
FIG. 3 illustrates another embodiment of the invention.

In accordance with another embodiment of the invention, the lenslet array could be eliminated by filling the interior of the concentrators with a high index of refraction, e.g. greater than two, transparent glass or other transparent material. The index of refraction should be high enough so that the rays at the desired acceptance angle are totally internally reflected. With this arrangement, the interior wall portion 11 need not be coated with a highly reflective material as the rays are totally internally reflected within the high index glass. This embodiment is shown in FIG. 3 wherein the interior of the converging channel is filled with a high index transparent material 20 such as glass.

Figure 4A:
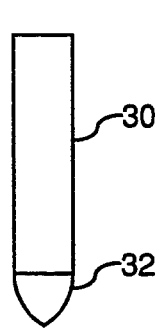
FIGS. 4(a), 4(b) and 4(c) illustrate a preferred method of forming the converging channels of the micro-sized light concentrators.
Figure 4B:
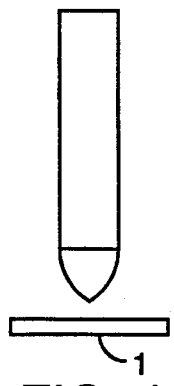
Figure 4C:
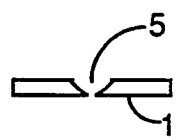

A preferred method of making the micro-sized concentrators is illustrated in FIGS. 4(a)-(c). This micro-machining method employs a cylindrical bit 30 having a 100 micron diameter and having a nose portion 32 shaped as shown and having the aforesaid hyperbolic or parabolic shape. The member 1 containing the concentrators could be a plastic sheet a very small portion of which is heated to a temperature just under its molten state. Each converging light transmissive channel is formed by driving the nose portion 32 of the bit completely through the entire thickness of the molten sheet portion 1 to produce the converging channel 11 as indicated in FIG. 4(c). An adjacent sheet portion is heated next and the bit is driven through this now molten portion to form the second channel and so forth for the remaining channels. For certain thin sheet members 1, and/or for certain materials it may be feasible to drive nose portion 32 completely through the sheet material without heating the sheet portion under the bit 30. The sequential production of the channels using a single machine bit may be carried out by a conventional step-and-repeat platform supporting the sheet 1. The heating of the plastic also removes surface roughness, resulting in a smooth concentrator profile.

Since other embodiments of the invention will occur to those skilled in the art, the scope of the invention is to be limited solely by the terms of the following claims and art recognized equivalents thereof.

I claim:

1. A light ray concentrating light image sensor device comprising:
    (a) an array of light image detectors for detecting picture elements of a light image viewed by said image sensor device;
    (b) an array of converging light transmissive channels having light reflective portions therein and upper portions and lower portions smaller than the upper portions, the lower portions thereof being aligned with the light image detectors; and
    (c) a lenslet array, the lenslets thereof being aligned with said converging light transmissive channels.

2. The device of claim 1 wherein said light image detectors are substantially smaller than the upper portions of the converging light transmissive channels thereby enabling non-optical components to be positioned between said light image detectors if desired.

3. The device of claim 2 wherein said upper portions have diameters of 100–200 microns and said lower portions have diameters of 2–50 microns.

4. The device of claim 1 wherein said light reflective portions have parabolic or hyperbolic shapes, thereby to maximize the acceptance angle of light rays entering the converging light transmissive channels to in turn maximize the efficiency of the device.

5. The device of claim 2 wherein said light reflective portions have parabolic or hyperbolic shapes, thereby to maximize the acceptance angle of light rays entering the converging light transmissive channels to in turn maximize the efficiency of the device.

6. The device of claim 3 wherein said light reflective portions have parabolic or hyperbolic shapes, thereby to maximize the acceptance angle of light rays entering the converging light transmissive channels to in turn maximize the efficiency of the device.

* * * * *